United States Patent [19]
Trefethen

[11] Patent Number: 5,896,825
[45] Date of Patent: Apr. 27, 1999

[54] DUAL HULL WATERCRAFT

[76] Inventor: Lloyd M. Trefethen, 23 Barberry Rd., Lexington, Mass. 02173

[21] Appl. No.: 08/961,746

[22] Filed: Oct. 31, 1997

Related U.S. Application Data

[60] Provisional application No. 60/030,193, Nov. 4, 1996.
[51] Int. Cl.[6] .................................................... B63B 35/00
[52] U.S. Cl. .................................. 114/39.28; 114/61.015
[58] Field of Search .............................. 114/39.26, 39.28, 114/29.29, 61.1, 61.15, 39.1, 61

[56] References Cited

U.S. PATENT DOCUMENTS

| | | | |
|---|---|---|---|
| 606,104 | 6/1898 | Twining | 114/39.28 |
| 3,295,487 | 1/1967 | Smith | 114/66.5 |
| 3,870,004 | 3/1975 | Bailey | 114/39 |
| 4,280,428 | 7/1981 | Werner, Jr. | 114/39 |
| 4,831,950 | 5/1989 | Allured | 114/39.28 |
| 4,867,089 | 9/1989 | Haigis | 114/39 |

*Primary Examiner*—Ed L. Swinehart
*Attorney, Agent, or Firm*—Lappin & Kusmer LLP

[57] ABSTRACT

In a dual-hull watercraft, a separate keel hull and sail hull are connected by a tie line. The sail hull comprises a sail and hull without a keel. The keel hull comprises a keel and hull or a submerged keel. The flexible tie line is coupled to the keel at or near the keel center of effort and is coupled to the sail at or near the center of sail effort. During operation, the sail and keel are configured to "toe in" relative to each other, maintaining tension in the tie line allowing the sail and keel to provide for the other's drag. The tie line allows for directional steering of the craft without a rudder, and for controlling the speed of the craft and the heel angles of the sail and keel hulls. Two gliders similarly connected can exploit wind velocity differences and are operable without updrafts.

8 Claims, 10 Drawing Sheets

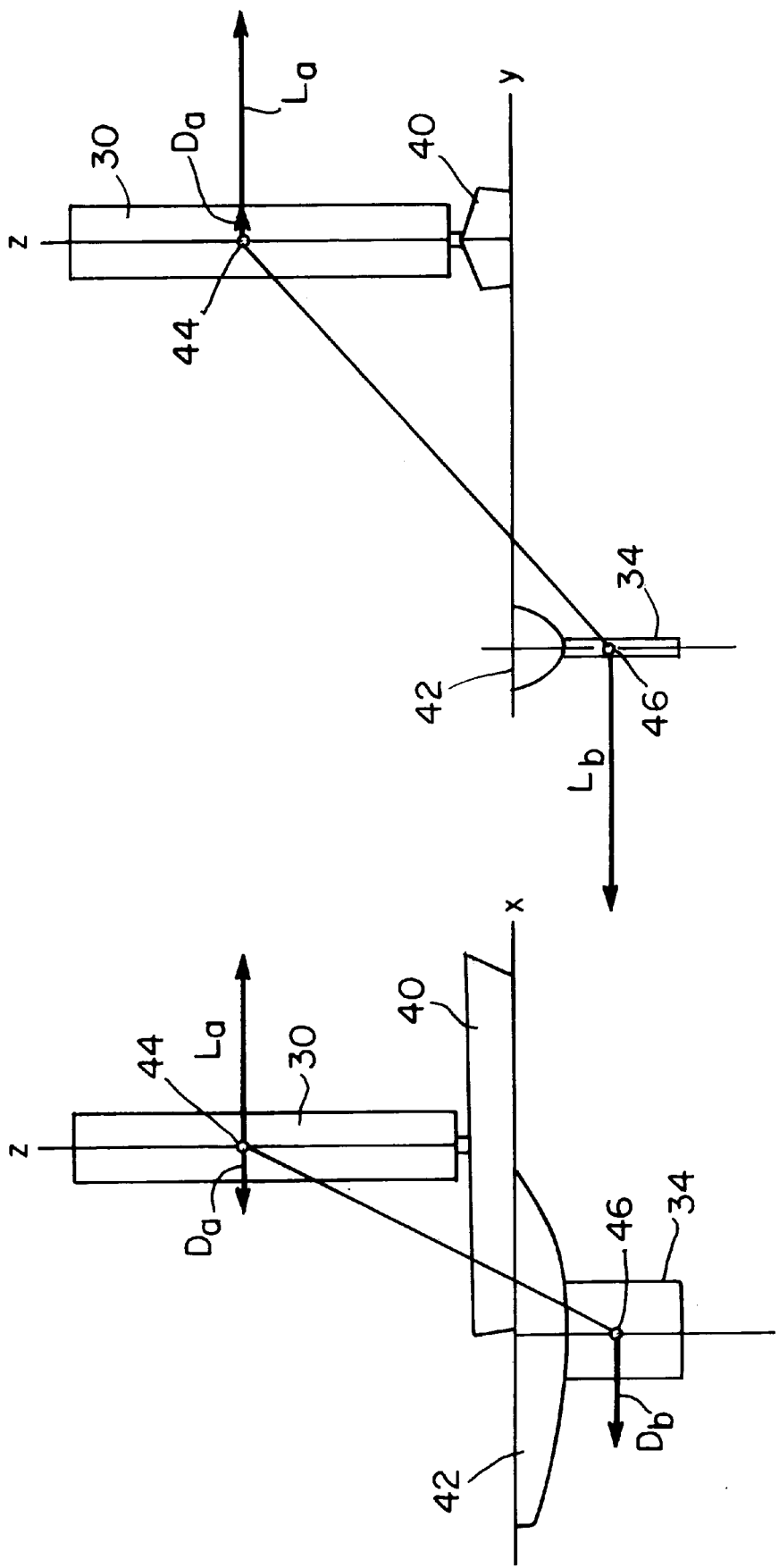

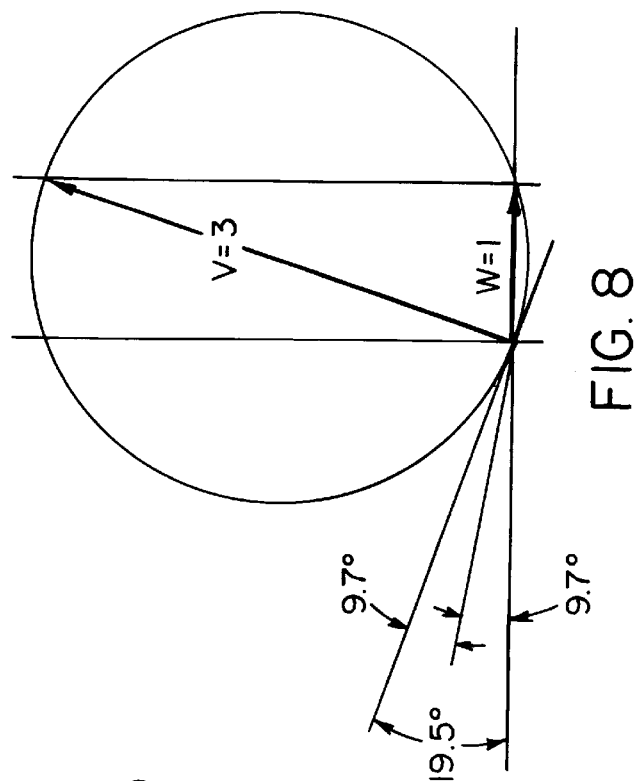
FIG. 8
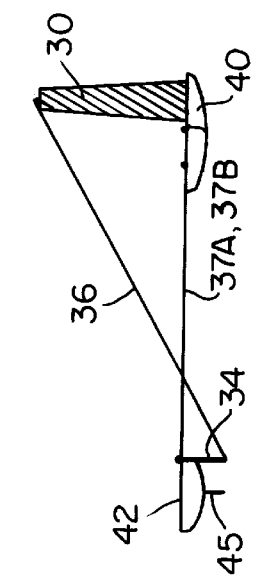
FIG. 7D
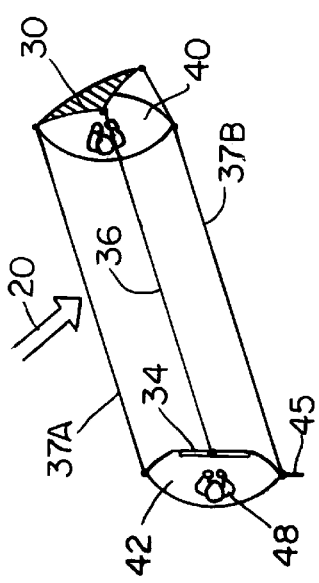
FIG. 7A
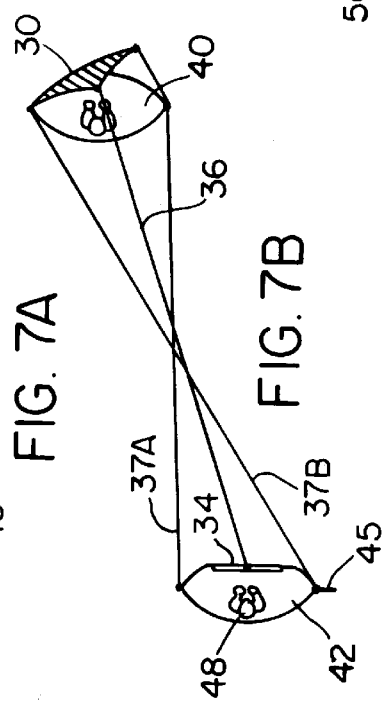
FIG. 7B
FIG. 7C

DUAL HULL WATERCRAFT

RELATED APPLICATIONS

This application claims the benefit of U.S. Provisional Application No. 60/030,193, filed Nov. 4, 1996, the contents of which are incorporated herein by reference.

BACKGROUND OF THE INVENTION

A traditional sailboat includes a hull, a sail-foil, and a keel-foil. The sail-foil travels through a first fluid (air) at a first vector velocity. The keel-foil travels through a second fluid (water) at a second vector velocity. The difference in vector energies is translated into work used for moving the boat. Both the sail-foil and the keel-foil have drag, and each individually is unable to compensate for its own drag. However, because the sail-foil and keel-foil are coupled through the hull of the boat, each compensates for the other's drag.

Conventional sailboats experience a torque effect called heeling. Heeling is caused by a downwind force operating on the sail compounded by an upwind force operating on the keel. On monohulls, catamarans, and trimarans, the keel-foil is located either directly under or nearly under the sail, resulting in a heeling torque. This heeling torque causes the boat to tilt to leeward, increasing hull drag, reducing sail efficiency, and, when large, causing the boat to capsize.

With reference to Prior Art FIGS. 1A–1C, heeling torque in monohulls (FIG. 1A), catamarans (FIG. 1B) and trimarans (FIG. 1C) is illustrated. In the monohull of FIG. 1A, a sail foil 23 and keel foil 22 are rigidly coupled to a hull 21 as shown. When a wind 20 is incident on the sail foil, a sail force $F_{sail}$ operates at or near the point of the center of effort of the sail foil 23 in the direction shown, and a keel force $F_{keel}$ operates at the center of effort of the keel foil 22 in the direction shown. $F_{sail}$ represents the total force of air on the boat, and $F_{keel}$ represents the total force of water on the boat, excluding buoyancy forces. These operating forces are offset by a distance d, generating a moment on the hull 22, referred to as a heeling torque $\tau_{heel}$. Similarly, in the catamaran of FIG. 1B including dual hulls of pontoons 25A, 25B joined by connecting structure 24, and the trimaran of FIG. 1C including dual hulls of pontoons 25A, 25B and dual connecting structures 24A, 24B, the operative forces $F_{sail}$, $F_{keel}$ generate heeling torques $\tau_{heel}$ in the respective crafts.

Ballast is employed to compensate for heeling torque in conventional sailboats. In smaller boats such as Sunfish™ and Lasers™, human ballasts are used. Sailors "hike out" on the windward side of the boat to level off the boat. Dual-hull catamarans employ the advantage of a longer moment arm between hulls or pontoons, increasing the metacentric height, thereby allowing for larger sails and increased speeds, but if the catamarans are small in size, they still require human ballast. In larger sailboats, the ballast weight of the sailors becomes insufficient. For this reason, weight is added to the keel of the boat, increasing the displacement and hull drag. In some monohulls, up to 70 percent of the weight of the boat is lead ballast in the keel.

SUMMARY OF THE INVENTION

The present invention is directed to a sailboat configuration which substantially eliminates heeling torque. The sail force is offset by an equal and opposite keel force operating directly at or near the same location as the sail force. This is accomplished by dividing the sailboat into a keel-foil and a sail-foil coupled by a flexible tie line.

In a preferred embodiment, a sail hull comprises a sail and hull without a keel. A keel hull comprises a keel and hull or a submerged keel. The keel hull is positioned upwind relative to the sail hull. A first end of the tie line is coupled to the keel at or near the keel center of effort and a second end of the tie line is coupled to the sail at or near the center of sail effort. During operation, the sail and keel are configured to sail in a "toe in" relationship, maintaining tension in the tie line, thereby allowing the sail and keel to provide for the other's drag. The tie line also serves the purpose of steering the craft without a rudder, and controlling the direction, speed and heel angles of the sail and hull.

The present invention eliminates the need for extra weight or ballast in the keel, as the keel serves to provide lateral resistance, and does not need to be heavy enough to compensate for heeling torque as in prior sailboat configurations. With elimination of heeling torque, "hiking out" by the sailors is unnecessary, sail size can be increased, and smaller hulls with lower displacements can be employed. This leads to the possibility of more efficient lift-to-drag ratios and therefore greater upwind and downwind speeds, and planing or hydrofoil-supported hulls.

In a preferred embodiment, the tie line is non-rigid or flexible, eliminating any moments or torsions between the sail foil and keel foil. The tie line is preferably coupled to the sail foil and keel foil with an adjustable bridle adapted for controlling the position of the tie line such that during sailing, it is continually directed toward the virtual net force centers of the sail and keel foils, or displaced to change direction, speed or heel. No rudders are needed. With a flexible tie line, the distance between the sail and keel can easily be adjusted. With multiple lines, a rudder is needed on one hull, and steering, speed, and heeling can be controlled from a single hull. In this manner, the present invention provides a fundamental and rare change in sail craft configuration, on the order of magnitude of the pivoting mast, which resulted in the now widespread sport of windsurfing.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, an emphasis instead being placed upon illustrating the principles of the invention.

FIGS. 3A, 3B, and 3C are top, side and front views respectively of a force diagram for a dual-hull watercraft configuration in accordance with the present invention.

FIGS. 7A–7D illustrate top and side views of alternative tie-line embodiments in accordance with the present invention.

FIG. 8 is a polar diagram of possible hull velocity vectors for a lift/drag ratio approximately equal to three.

DETAILED DESCRIPTION OF PREFERRED EMBODIMENTS

The present invention is based on the well-known hydrodynamic principle that foils can extract energy from two moving fluids. Sailboats use this energy to cancel their drag energy losses.

Figure 1A:
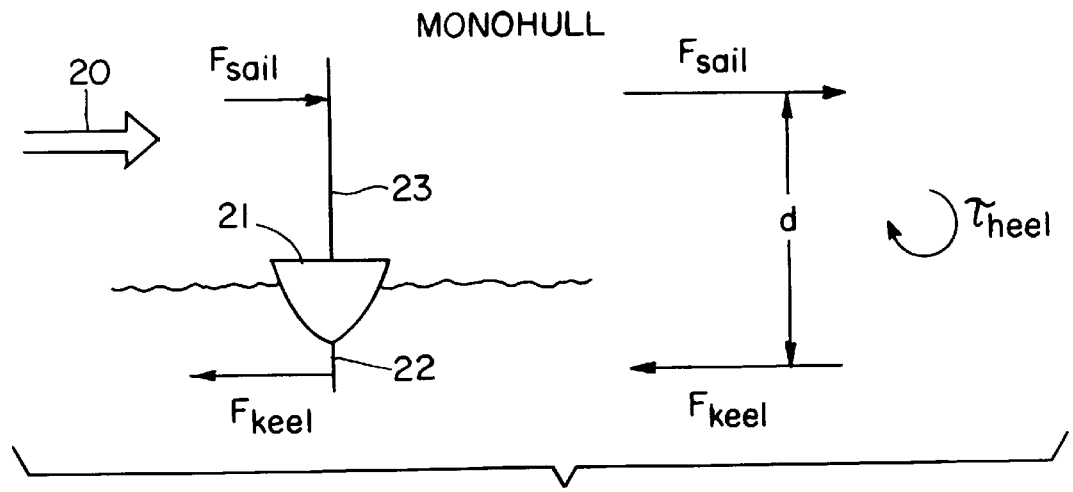
FIGS. 1A, 1B, 1C are prior art cross-sectional illustrations of the forces operating on a monohull, catamaran, and trimaran respectively.
Figure 1B:
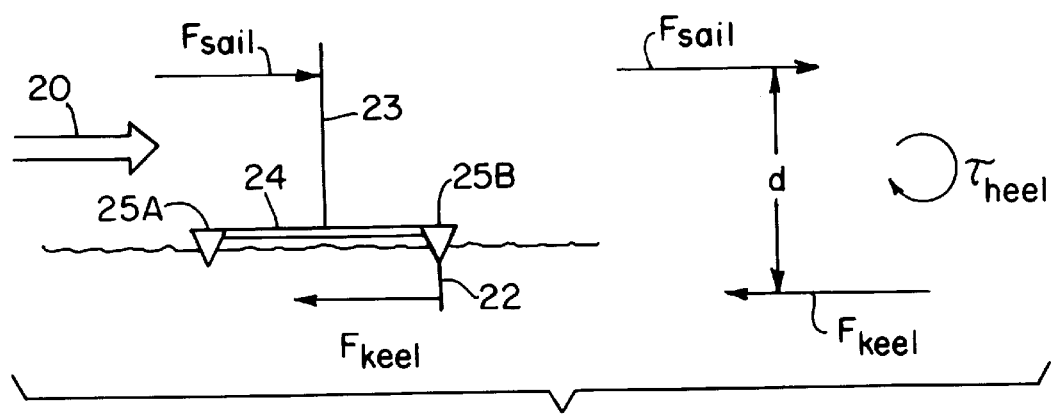
Figure 1C:
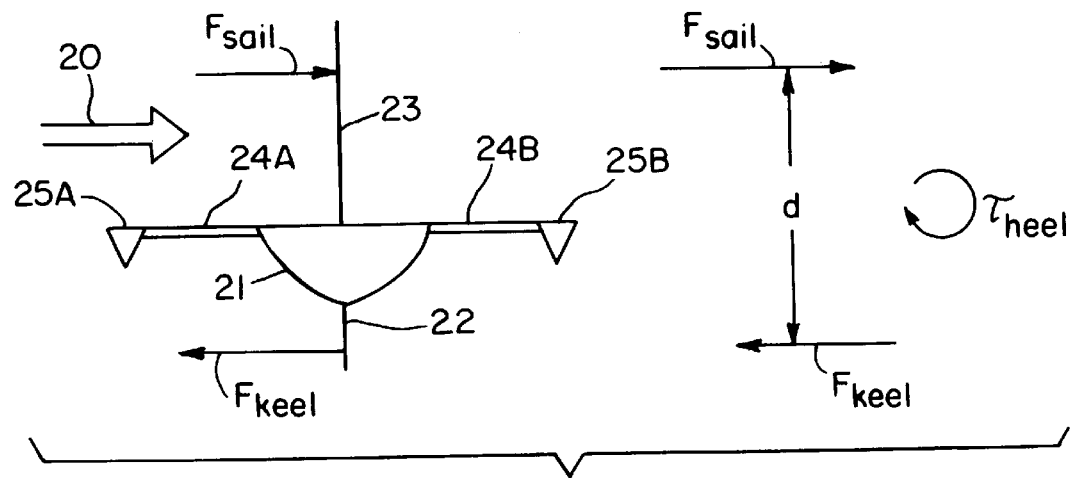
Figure 2:
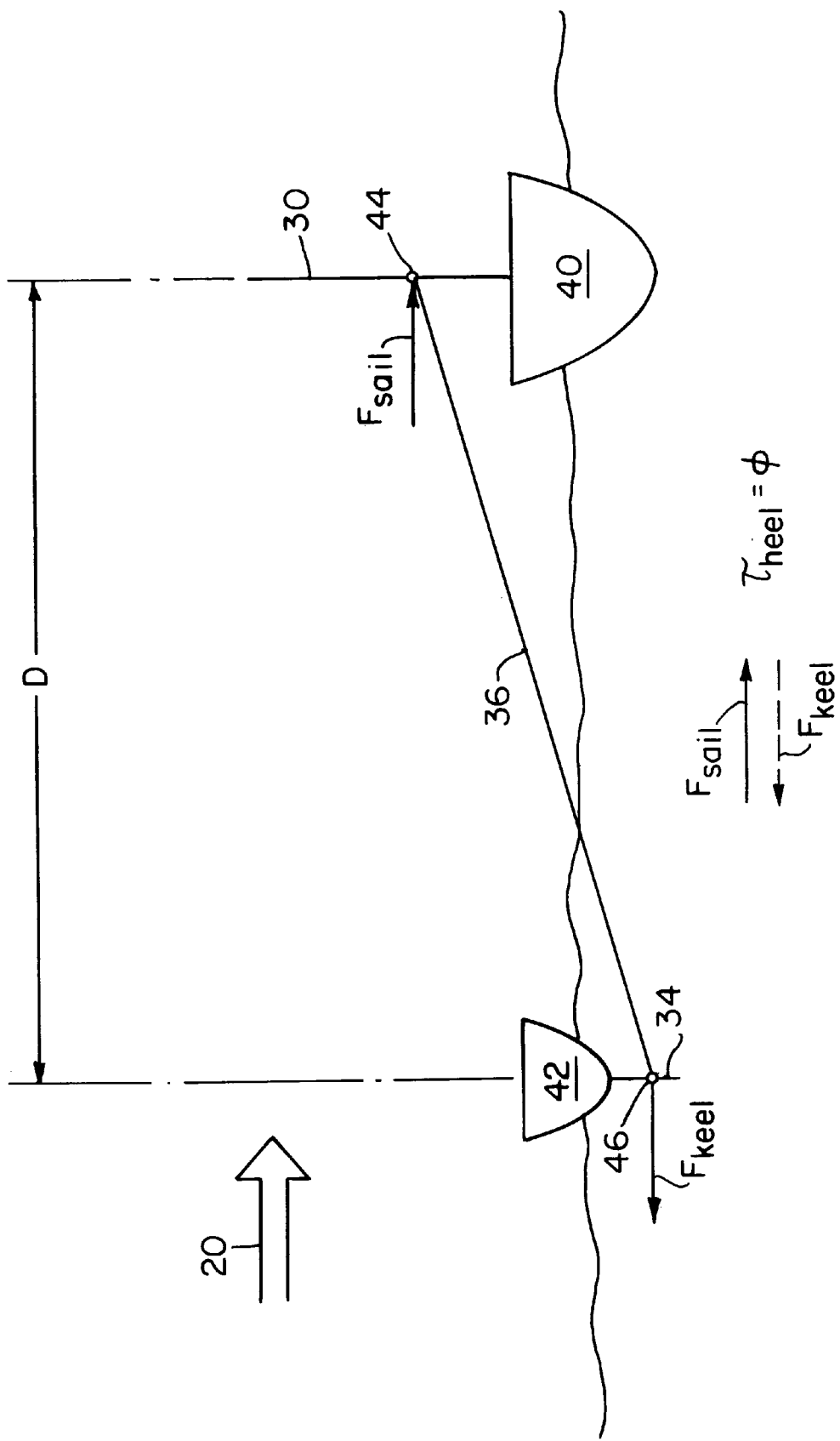
FIG. 2 is a cross-sectional illustration of the forces operating on the improved dual hull configuration of the present invention.

Unlike the prior art watercraft illustrated above, the configuration of the present invention is optimized to eliminate heeling torque. With reference to FIG. 2, a preferred embodiment of the present invention includes a sail hull 40 having a sail foil 30 erected thereon or otherwise coupled thereto, and a keel hull 42 with a corresponding keel foil 34 suspended therefrom. A tie line 36 constructed of steel able, nylon rope or elastic rope couples the foils at or near their respective centers of effort 44, 46. In this manner, the keel force $F_{keel}$ serves to counter the sail force $F_{sail}$, essentially eliminating the heeling torque $\tau_{heel}$ in both hulls. The virtual intersections of the tie line 36 with the respective foils are at or near the centers of net force in steady-state sailing, and are adjustable by single or multiple control lines or by a bridle to change to a new steady-state direction, speed, or heel. In this manner, the tie line is used for controlling the parameters of hull heeling, craft speed, and direction of sail.

The tie line 36 is preferably flexible for eliminating moments between the sail hull 40 and keel hull 42 thus eliminating the wracking forces that damage multi-hull craft. During sailing, the tie line is preferably adjustable in length for controlling the distance D between hulls for optimum sailing under different sea conditions and adjustable in orientation for positioning the direction of the tie line 36 at or near the sail 30 center of effort 44, and at or near the keel 34 center of resistance 46, for optimized steady-state sailing. Flexibility in the tie line also affords more practical advantages over a rigid member, including a simpler form of construction, a length which can be readily adjusted, and convenient elimination of the line for docking the hulls such that they can be berthed separately. The tie line can also be elastic, moderating the magnitude of wave-induced forces. Furthermore, the hulls can be used for other purposes, for example the keel hull can be designed to be used as a dinghy when under power or at anchor, and as a keel boat when under sail.

Figure 3A:
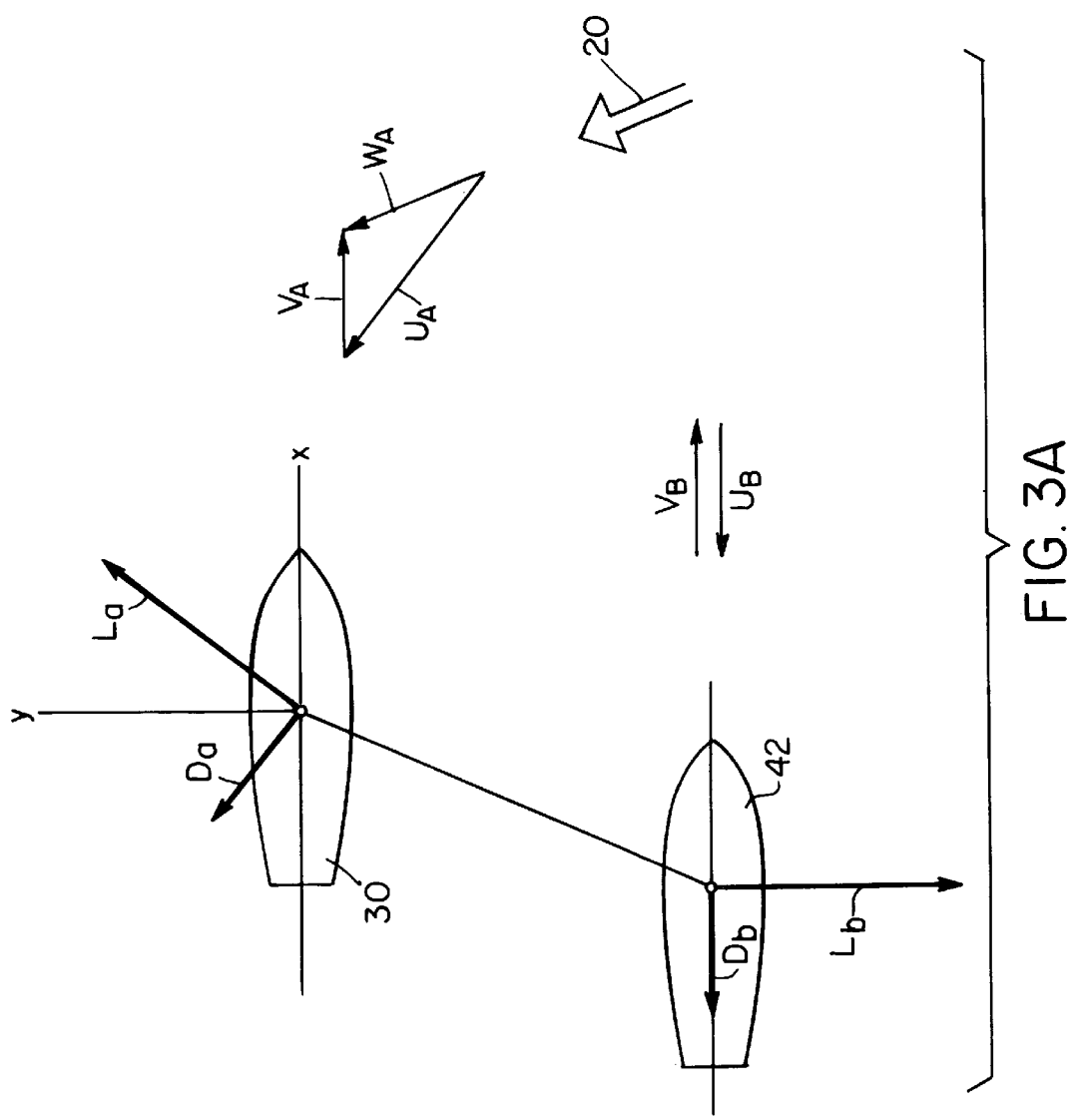

FIGS. 3A, 3B, and 3C are top, side, and front views of the steady-state forces operating on a watercraft configured in accordance with the present invention. Assume a wind 20 operating on the sail hull 30 of a velocity $W_A$, and a sail hull traveling at a velocity $V_A$, combining to provide an apparent wind $U_A$ as shown in FIG. 3A. The air and water movement past the two foils 30, 34 shown in FIG. 3B generate a force on each foil, composed of a drag component D, in the direction of the oncoming fluid and a lift component L, orthogonal to the oncoming fluid and the axis of the foil.

Figure 4:
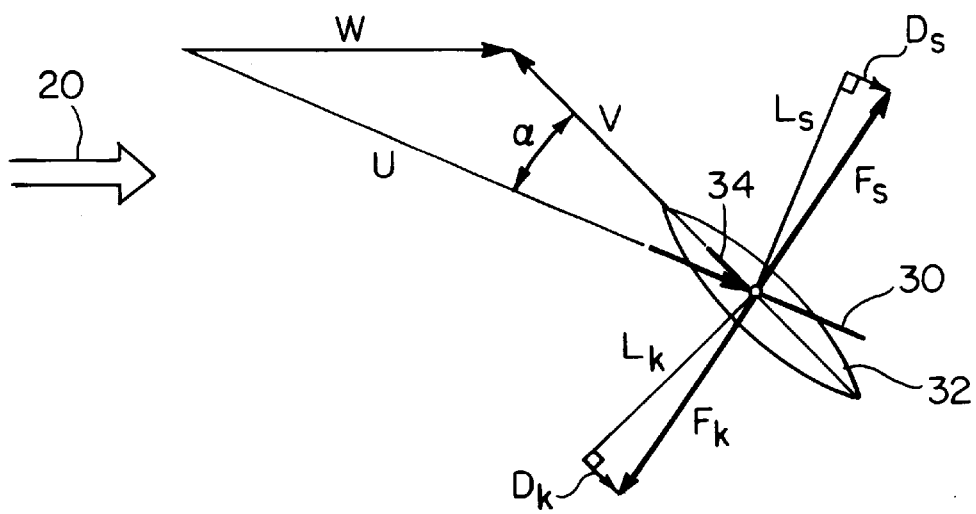
FIG. 4 is a prior art illustration of forces operating on a sailboat during steady-state sailing in accordance with the prior art.

With reference to Prior Art FIG. 4, assuming a wind at a velocity W operating on sail 30, and assuming stationary water, a sailboat can move through the water at a velocity V. The wind velocity W and the craft velocity V vectors combine to provide an apparent wind U as experienced by the sails 30 and upper hull 32. The water velocity and apparent wind velocity U impose equal and opposite forces on the craft: $F_s$—the total force of the wind on the sail; and $F_k$— the total force of the water on the keel 34. These forces cancel and the result is a zero net force on the boat assuming steady-state sailing. The wind and water velocities are at an angle $\alpha$ to each other, enabling each of the sail 30 and keel 34 foils to have the force components necessary to pull the other through its fluid against its drag resistance. The forces $F_s$ and $F_k$, while equal and substantially horizontal are not at the same height, generating a heeling torque, as described above.

Figure 5:
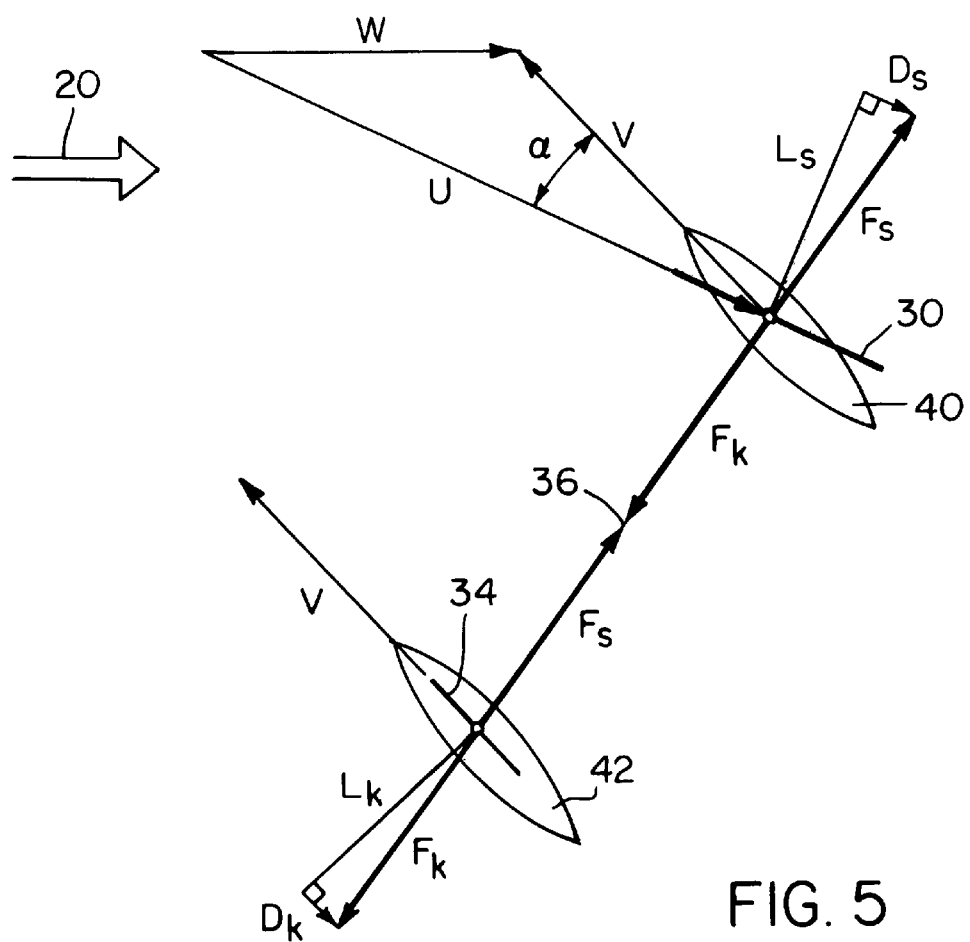
FIG. 5 is an illustration of forces operating on a dual-hull watercraft during steady-state sailing in accordance with the present invention.

In the inventive configuration of FIG. 5, during steady-state sailing, the keel hull 42 and sail hull 40 travel through the water at a velocity V. The tie line 36 is tensioned between the virtual center of water force on the keel 34 and the virtual center of air force on the sail 30. Wind and water forces can be divided into lift components $L_s$ and $L_k$, and drag components $D_s$ and $D_k$, parallel and perpendicular to their oncoming fluid velocities. The lift-to-drag ratios of the respective foils are generally unequal. The lift $L_s$ and drag $D_s$ forces operating on the sail combine as a sail force $F_s$, while the lift $L_k$ and drag $D_k$ forces operating on the keel 34 combine to produce $F_k$. The sail and keel forces $F_s$, $F_k$ are translated through the tensioned tie line 36 to offset each other, thereby eliminating heeling torque in the keel hull 42 and the sail hull 40.

For the craft to operate effectively, it is necessary that the hulls toe in toward each other by an angle a during sailing such that the tie line force between them tugs on each hull at an angle that provides the necessary force components to counter the drag force of the sail hull and the drag of the keel hull. Accordingly, each drags the other forward.

Figure 6A:
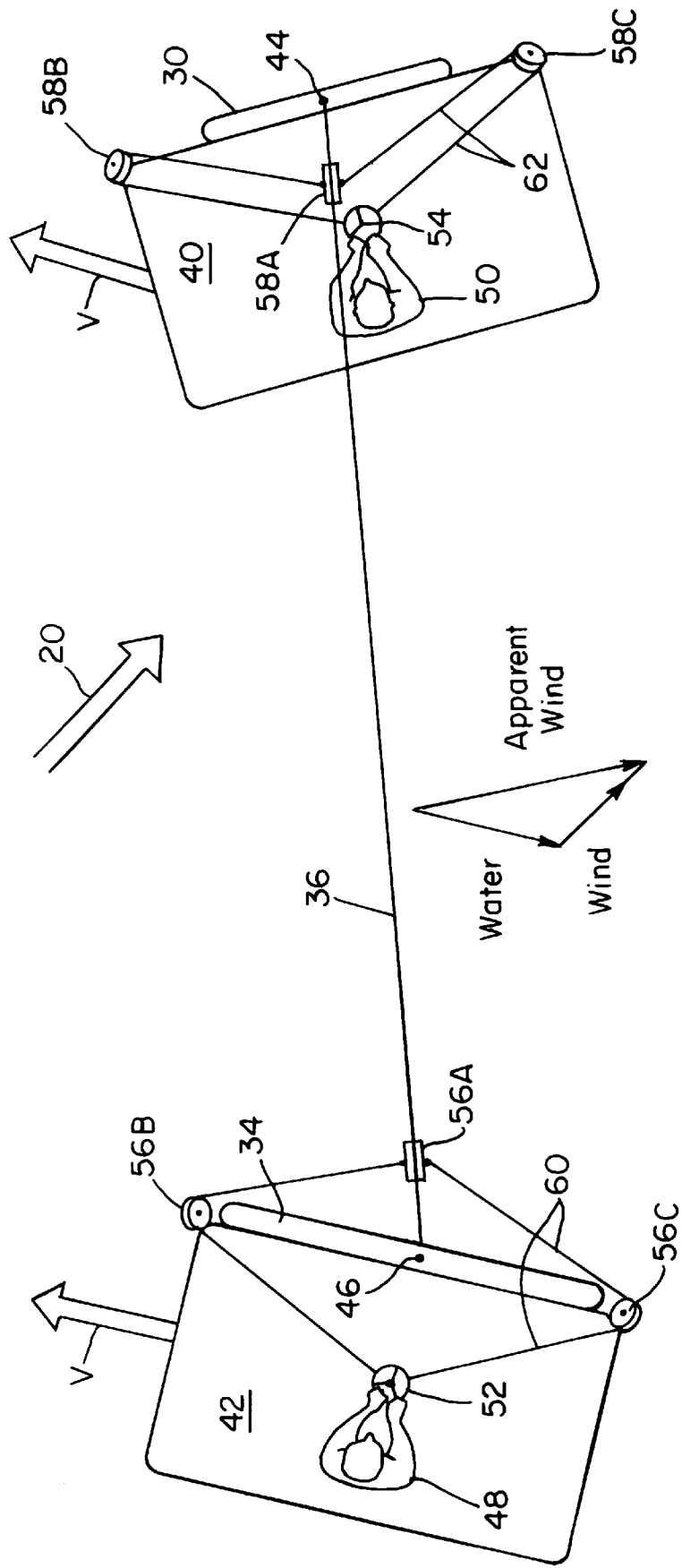
FIGS. 6A and 6B are top and side views of a dual-hull watercraft illustrating the operation of the adjustable tie line in accordance with the present invention.
Figure 6B:
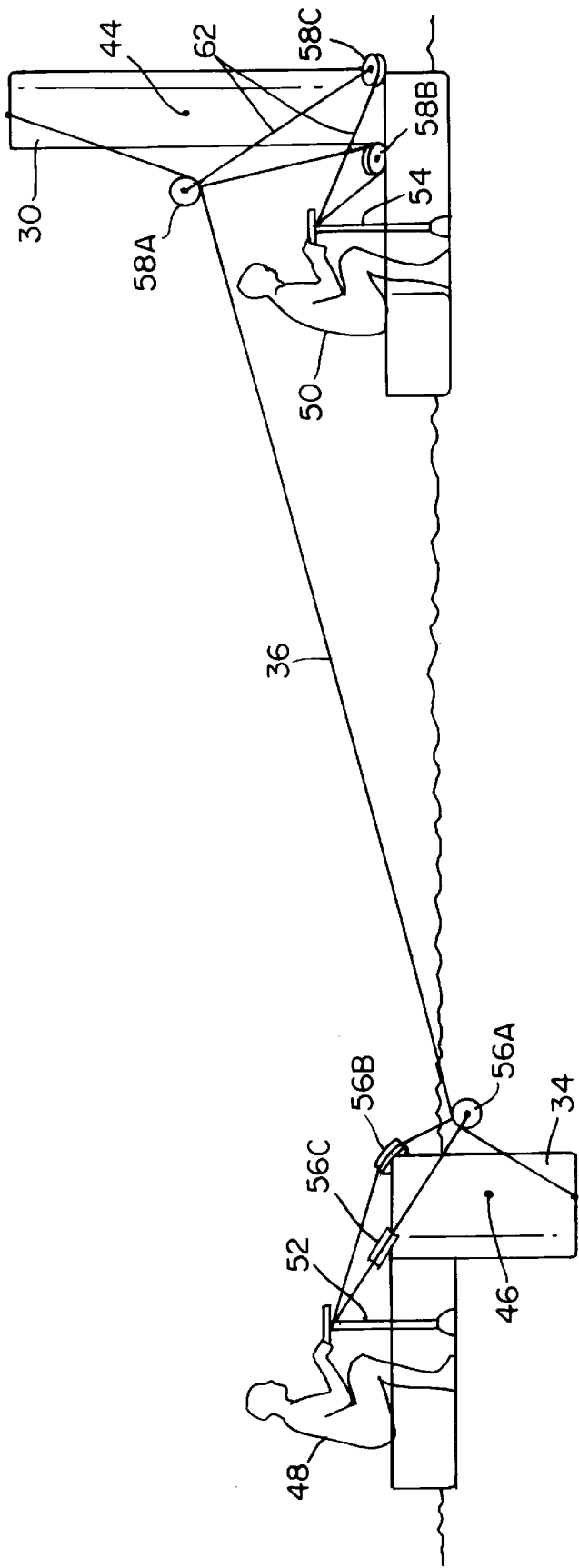

FIGS. 6A and 6B are top and side views respectively of a watercraft configured in accordance with the present invention, illustrating the principles of adjusting the orientation of the tie line 36. As stated above, if the tie line 36 is oriented to have a virtual intersection point with the virtual centers of force of the sail and keel, there is no heeling moment in the craft. By adjusting the orientation of the tie line during steady-state sailing, an optimal sailing configuration can be maintained.

A keel hull 42, including keel 34 having a center of effort 46, is positioned slightly upwind of a sail hull 40. The sail hull 40 includes a sail 30 erected thereon and exposed to wind forces 20 which collectively operate at the sail center of effort 44. During steady-state sailing, a first operator 48 of the keel hull 42 maneuvers bridle control line 60, with control lever 52 to adjust the fore, aft, up, and down positioning of the orientation of the tie line 36 with respect to the keel center of lateral resistance 46. In the position shown, when the operator pulls control lever 52 toward his body, the control line coupled through pulleys 56A, 56B, and 56C, raises pulley 56A thereby raising the orientation of the tie line 36. When the operator 48 pushes the control lever 52 away from his body, the pulley 56A will lower, thereby lowering the orientation of the tie line 36. Fore and aft movement of the control lever 52 likewise produces corresponding fore and aft movement of the direction of the tie line 36.

Similarly, an operator 50 of the sail hull 40 controls the orientation of the tie line 36 relative to the sail center of effort 44. A control lever 54 is coupled to control line 62 and pulleys 58A, 58B, and 58C. Pulling the control lever 54 in a direction toward the operator's body causes pulley 58A to lower, thereby lowering the orientation of the tie line. Pushing the control lever away from his body raises the orientation of the tie line 36. Fore and aft movement of the control stick results in a corresponding fore and aft adjustment of the orientation of the tie line 36 relative to the sail 30. Each operator thus controls the heel of his hull, and by moving the line fore or aft, causes a horizontal moment arm that provides a vertical torque to change the orientation of the hull. The two operators thus provide the four controls necessary to determine speed, direction, and the two heel angles. Rudders, which operate to change the magnitude and position of the water force vector, become unnecessary.

Four variables are controlled while sailing: the direction of the craft, the speed of the craft, the heel angle of the sail hull, and the heel angle of the keel hull. With reference to FIGS. 7A, 71B, and 7D control may be provided in the following manner: changing the lengths of the tie lines 37A, 37B; adjusting the vertical position of the tie line 36 shown attached to the bottom of the keel 34; and use of the rudder 45 shown on the keel hull 42. Thus, speed, direction and heel can be controlled by a single operator 48 in the keel hull 42 or divided up among crew on both hulls. Control is also possible via a single tie line 36 in a rudderless configuration, requiring operators 48, 50 on each craft as shown in FIG. 7C and explained above in conjunction with FIGS. 6A and 6B.

The lift-to-drag ratio of a body moving through a stationary fluid is taken as the ratio of the fluid-induced force perpendicular to motion, i.e. the "lift", to the fluid-induced force parallel to the motion, the "drag". Since a sailboat has no net lift or drag in steady state motion, the standard definition for lift-to-drag ratio does not apply. However, by considering separately the efficiencies of the sail and keel foils, the lift/drag ratio (L/D) as defined below becomes a meaningful measure.

The toe-in angle α representing the angle between the oncoming air and water velocities, is the sum of the lift/drag angles of the two foils:

$$\alpha = \arctan(D_s/L_s) + \arctan(D_k/L_k) \quad (1)$$

where $D_s$ and $L_s$ are the drag and lift of the sail foil respectively, and $D_k$ and $L_k$ are the drag and lift of the keel foil respectively. The overall lift-to-drag (L/D) ratio of the craft is defined as:

$$L/D = 1/(D_s/L_s + D_k/L_k) \quad (2)$$

Boat speed is determined by the wind velocity and the L/D of the above and below water components. If the velocity V for a particular craft at various angles to the wind is plotted in the well known polar diagram of FIG. 8, the vector traces roughly a circle. The L/D ratios vary somewhat with angle to the wind. However, if the L/D ratios are assumed constant, then the polar diagram is a circle. The maximum speed is the diameter of the circle, the overall L/D, which is roughly half of the individual L/D's, multiplied by the wind velocity. Separation of the keel and sail by a tie line invites speculation about possible sailing speeds. Reduced displacement and additional sail area should lead to faster boats. The polar locus of possible twin foil boat velocities when the keel and sail hulls each have L/D ratios of six is the circle shown in FIG. 8. The maximum velocity of the craft is the circle diameter, at the angle a 19.5 degrees abaft the beam, resulting in a boat-to-wind velocity ratio of V/W=3.

A recent speed of 46.52 knots was achieved in 19 knot wind by Yellow Pages, a hard-wing unidirectional plaining multi-hull. The boat-to-wind record of 41 knots in a 14 knot wind is almost but not quite the V/W=3.

Experimental trials have illustrated the configuration of the present invention will sail, upwind as well as downwind, and that heel can be controlled at will. The speed of the craft is a function of the overall lift/drag ratio of the system. An overall lift/drag ratio of 3 is the best currently achieved by sailboats. It is expected that a lift-to-drag ratio of 4, or possibly 5 is achievable in the watercraft of the present invention.

With little need for ballast, displacement can be drastically reduced. This in turn reduces hull volume, below-water surface area and hull resistance. Freed of required ballast or for the need to counter heeling torque, both sail and keel hulls can be designed for planing. In an alternative embodiment, the sail foil may be configured as an elevated, hydrofoil hull.

Another alternative would be the complete submergence of the keel-foil structure operating with a control system that keeps the keel-foil submerged at an appropriate depth. Developments in this direction could lead to lift-to-drag ratios much higher than at present, leading to faster craft, with improved upwind ability.

Since sail area is no longer the limiting factor in causing heeling torque, increases in sail area and therefore propelling force can be envisioned. Rigid foils are becoming more common, particularly for multi-hulls. They become more feasible as the need for furling in high wind to avoid capsizing is reduced. The lack of need to keep the moment arm small will permit taller and more rectangular air foils that reach up to larger air velocities at higher altitudes. With larger aspect ratios, higher sail efficiencies can be realized.

A preferred embodiment includes keel and sail hulls which are largely symmetrical fore and aft, but not necessarily athwartships. Such asymmetry may be designed to enable side-by-side nesting of the two hulls when the wind is mild, so that the separated hulls are used only when the wind is strong enough for heel to be a problem.

Figure 9:
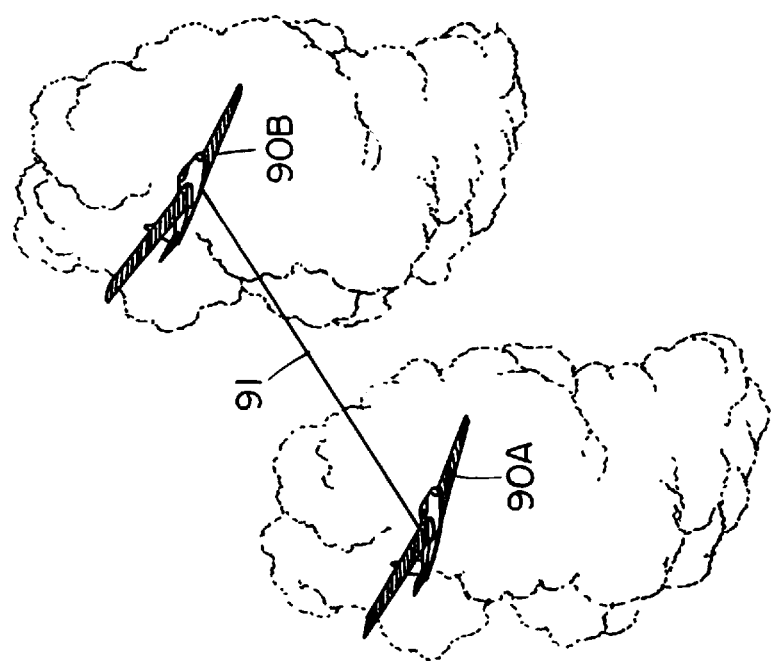
FIG. 9 illustrates the present invention applied to a glider configuration.

The principles of the present invention extend beyond watercraft and are applicable to any configuration which would exploit energy from two foils traveling in two fluids having different vector velocities. This includes foils traveling in the same fluid, for example a first glider 90A traveling in air can be coupled to a second glider 90B by a tie line 91 as shown in FIG. 9.

The force diagram for a sail hull and keel hull, illustrated in FIG. 5 applies to gliders with one exception. Since there is no air-water interface to provide buoyancy forces, the two glider foils 90A, 90B are preferably oriented to supply the necessary vertical weight components. Typical wind shear would require one glider to be above and to the side of the other. Just as with boats, the maximum velocities attained would be perpendicular to the wind, but unlike boats, which achieve velocities only twice or thrice the wind, gliders with their exceptionally large lift-to-drag ratios approaching 100 could sail at tens of times the difference in wind velocity.

One difference between a single glider and two connected gliders is that the dual gliders would not require weight. A single glider is pulled forward by a component of its gravity vector force, always gliding slightly downwards in its air. However, with two gliders, each pulling the other forward, there is no need for a gravity downhill force component to counter drag. For this reason, twin connected gliders would not need updrafts to fly.

Figure 10A:
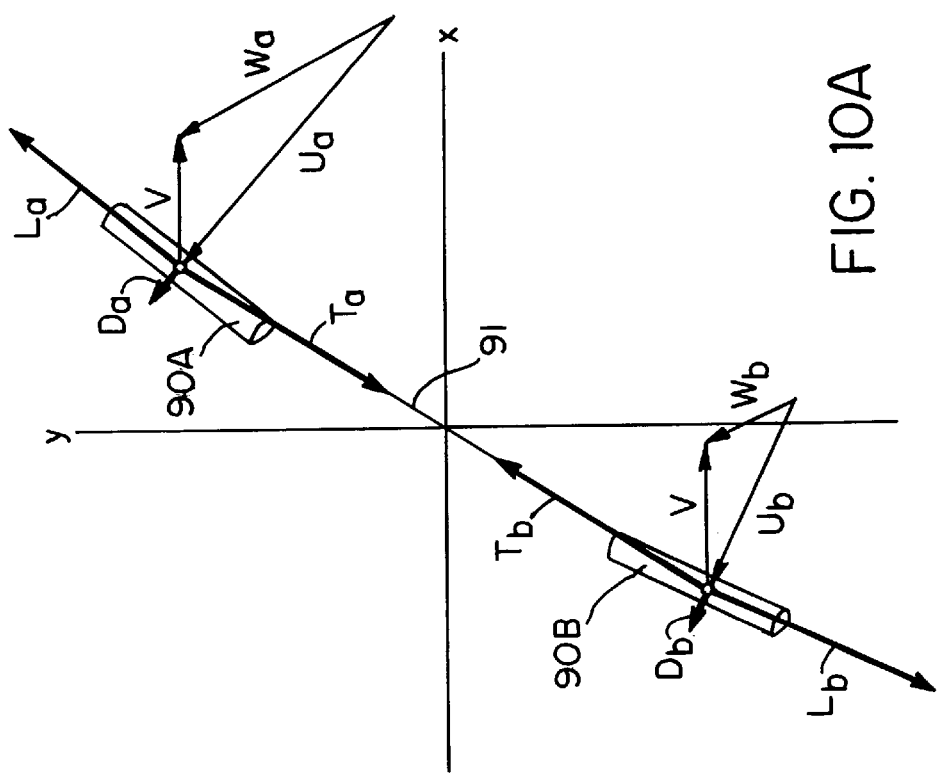
FIGS. 10A, 10B, and 10C are top, side, and front views respectively of a force diagram for the glider configuration in accordance with the present invention.
Figure 10C:
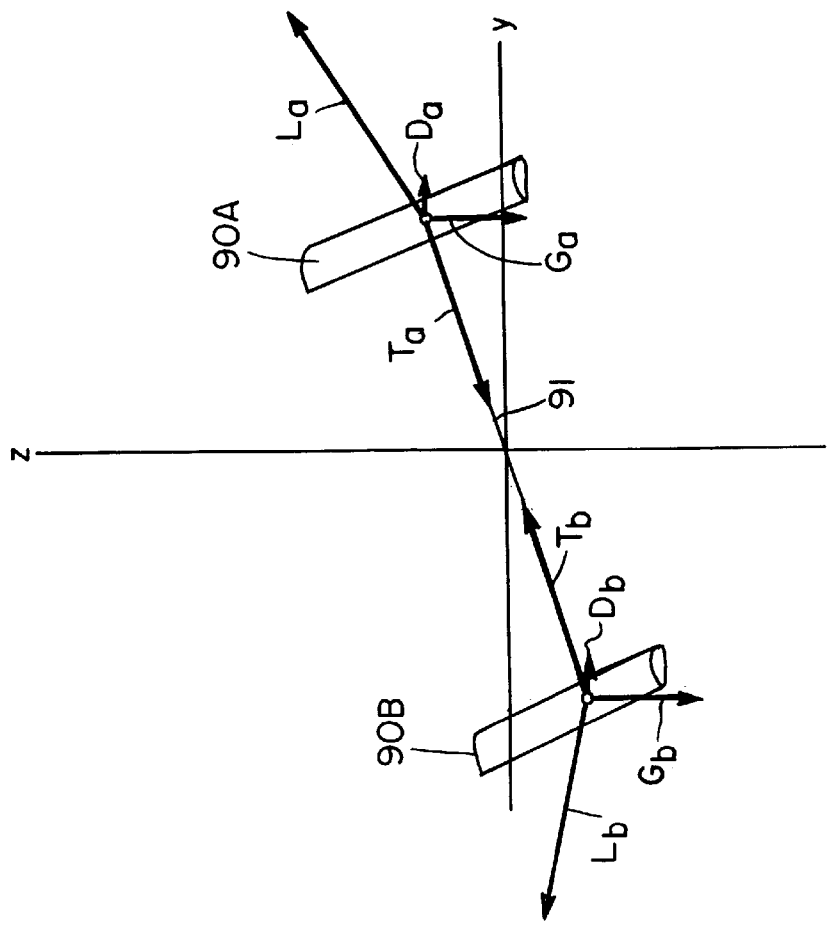
Figure 10B:
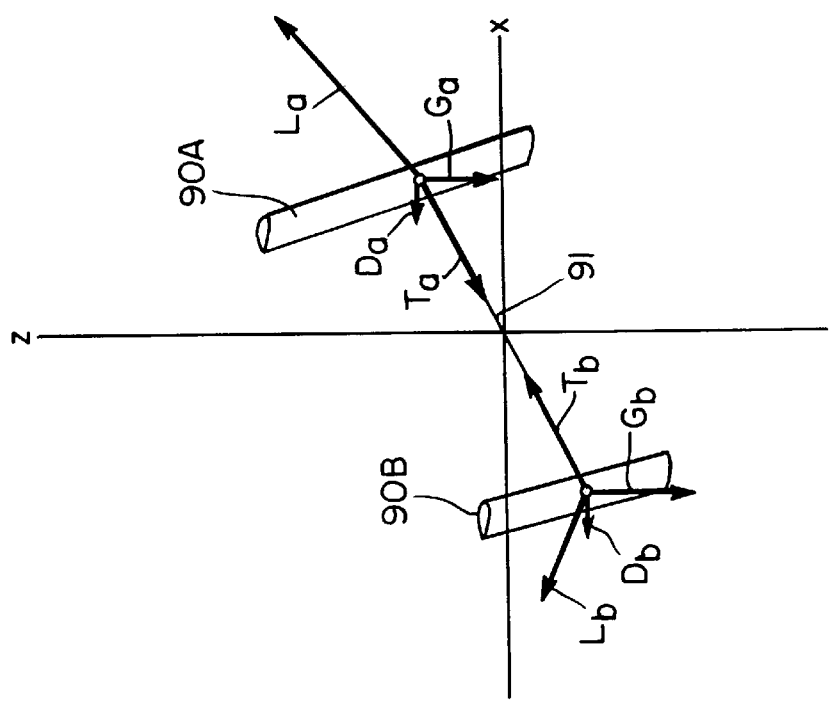

FIGS. 10A, 10B, and 10C are top, side, and front views respectively of a force analysis for the coupled air foil embodiment. When the winds incident on the two air foils are different, in either direction or magnitude, the apparent velocities $V_a$, $V_b$ can be made to "toe in" toward each other, enabling each foil to compensate for the other foil's drag through the tension in the connecting line. One skilled in the art of fluid dynamics would appreciate that the force analysis of FIG. 10 is similar to that of FIGS. 4 and 5, with the addition of a gravity force $G_A$, $G_B$. Potential applications of the twin glider embodiment include unmanned, hovering broadcast stations operating in locations of reliable wind shear.

While this invention has been particularly shown and described with references to preferred embodiments thereof, it will be understood by those skilled in the art that various changes in form and in details may be made therein without departing from the spirit and scope of the invention as defined by the appended claims.

For example, a rudder 45 may be added to either hull, as shown in FIGS. 7A and 7B, for emergency situations where the craft must be sailed as a single hull craft or to improve control of the magnitude and position of the water force vector. The tie line may comprise cable, rope, or elastic cord. Control over the heeling angles, direction and velocity may alternatively be provided remotely by electronic and/or mechanical means.

In an alternative embodiment, the sail hull and keel hull can be configured to be symmetric fore and aft such that the hulls can be sailed with equal efficiency on a port tack and starboard tack. The sail foil and keel foil can likewise be symmetrically configured, for example the sail foil may comprise a symmetric rigid foil, or flexible and reversible sail. Fore-aft symmetry simplifies tacking in the present configuration, which can be accomplished by a reversal of direction of the sail and keel hulls, such as the South Pacific proa, instead of the traditional 180 degree turn of the hull.

I claim:

1. A watercraft comprising:

a buoyant hull comprising a keel hull and sail hull;

a sail-foil having a center of effort, said sail-foil coupled to the sail hull and exposed to wind forces;

a keel-foil having a center of effort, said keel foil positioned upwind of the sail-foil, said keel-foil coupled to the keel hull and exposed to water forces; and a flexible tie line coupled near the virtual center of effort of the sail-foil and near the virtual center of effort of the keel-foil, said wind forces operating on the sail-foil and said water forces operating on the keel-foil during steady-state sailing, tensioning the tie line coupled therebetween, said water forces being translated through the tensioned tie line to the center of force of the sail-foil, eliminating heeling torque in the watercraft, said tie line having a length which is adjustable for adjusting the distance between said sail-foil and said keel foil and having an orientation which is adjustable for controlling heeling, speed, and direction of sail of said craft.

2. The watercraft of claim 1 wherein the sail-foil comprises a rigid sail.

3. The watercraft of claim 1 wherein the virtual intersection of the tie line and foils is at the centers of net force in steady-state sailing.

4. The watercraft of claim 1 further comprising a plurality of control lines, at least one line for controlling heeling in said sail hull and keel hull, and at least one line for controlling speed and direction of sail.

5. The watercraft of claim 1 wherein the tie line comprises line material selected from the group of materials consisting of steel cable, nylon rope, and elastic rope.

6. The watercraft of claim 1 wherein the sail hull and keel hull comprise planing hulls.

7. The watercraft of claim 1 further comprising an adjustable bridle coupling the tie line to the sail foil for controlling the orientation of the tie line relative to the virtual center of effort of the sail foil.

8. The watercraft of claim 1 further comprising an adjustable bridle coupling the tie line to the keel foil for controlling the orientation of the tie line relative to the virtual center of effort of the keel foil.

* * * * *